(12) United States Patent
Jung et al.

(10) Patent No.: US 10,805,948 B2
(45) Date of Patent: *Oct. 13, 2020

(54) METHOD AND DEVICE FOR SENDING AND RECEIVING SCHEDULING DATA IN A WIRELESS COMMUNICATION SYSTEM USING BEAMFORMING

(71) Applicant: Samsung Electronics Co., Ltd, Suwon-si (KR)

(72) Inventors: Jung-Soo Jung, Seongnam-si (KR); Yeong-Moon Son, Yongin-si (KR); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,242

(22) Filed: Mar. 18, 2019

(65) Prior Publication Data

US 2019/0215860 A1 Jul. 11, 2019

Related U.S. Application Data

(63) Continuation of application No. 14/443,036, filed as application No. PCT/KR2013/010346 on Nov. 14, 2013, now Pat. No. 10,237,887.

(30) Foreign Application Priority Data

Nov. 14, 2012 (KR) ........................ 10-2012-0128879

(51) Int. Cl.
*H04W 72/12* (2009.01)
*H04W 72/04* (2009.01)
(Continued)

(52) U.S. Cl.
CPC ...... *H04W 72/1289* (2013.01); *H04B 17/318* (2015.01); *H04L 5/0035* (2013.01);
(Continued)

(58) Field of Classification Search
CPC .......... H04W 72/046; H04W 72/1215; H04W 72/1273; H04W 72/1278–1289;
(Continued)

(56) References Cited

U.S. PATENT DOCUMENTS

| 6,771,987 B1 | 8/2004 | Dam et al. |
|---|---|---|
| 2010/0027471 A1 | 2/2010 | Palanki et al. |

(Continued)

FOREIGN PATENT DOCUMENTS

| CN | 1143571 C | 3/2004 |
|---|---|---|
| CN | 102113237 A | 6/2011 |

(Continued)

OTHER PUBLICATIONS

Notice of Allowance, dated Nov. 20, 2017, regarding Japanese Patent Application No. 2015-542950, 10 pages.
(Continued)

*Primary Examiner* — Marcus Smith

(57) ABSTRACT

According to an embodiment of the present invention, a method whereby a terminal receives scheduling data in a wireless communication system using beamforming comprises the processes of: receiving scheduling data via a first scheduling channel from a first base station; and receiving scheduling data via at least one second scheduling channel, by using at least one receiving beam from at least one second base station that cooperates (cooperate) with the first base station.

20 Claims, 18 Drawing Sheets

(51) Int. Cl.
*H04L 5/00* (2006.01)
*H04B 17/318* (2015.01)
*H04W 16/28* (2009.01)

(52) U.S. Cl.
CPC ..... *H04W 72/046* (2013.01); *H04W 72/0446* (2013.01); *H04W 72/1231* (2013.01); *H04W 16/28* (2013.01)

(58) Field of Classification Search
CPC ........... H04W 76/15–16; H04W 76/25; H04W 92/10; H04W 92/20; H04L 5/0035
See application file for complete search history.

(56) References Cited

U.S. PATENT DOCUMENTS

| | | |
|---|---|---|
| 2011/0218011 A1 | 9/2011 | Kim et al. |
| 2011/0317637 A1 | 12/2011 | Kim et al. |
| 2012/0027108 A1 | 2/2012 | Hong et al. |
| 2012/0046033 A1 | 2/2012 | Ko et al. |
| 2012/0165034 A1 | 6/2012 | Boudreau et al. |
| 2012/0250551 A1 | 10/2012 | Sartori et al. |
| 2013/0258974 A1 | 10/2013 | Lee et al. |
| 2013/0301455 A1 | 11/2013 | Jung |
| 2013/0331136 A1 | 12/2013 | Yang et al. |
| 2014/0029584 A1 | 1/2014 | Qu et al. |
| 2014/0092865 A1* | 4/2014 | Heo ................. H04W 52/0235 370/331 |
| 2014/0146756 A1 | 5/2014 | Sahin et al. |
| 2014/0247744 A1 | 9/2014 | Agiwal et al. |
| 2015/0043457 A1 | 2/2015 | Liu et al. |
| 2015/0230263 A1* | 8/2015 | Roy ....................... H04W 16/28 455/452.2 |
| 2015/0282036 A1 | 10/2015 | Yi et al. |

FOREIGN PATENT DOCUMENTS

| | | |
|---|---|---|
| EP | 1096696 A1 | 5/2001 |
| KR | 10-2009-0101760 A | 9/2009 |
| KR | 10-2010-0064334 A | 6/2010 |
| KR | 10-2010-0117522 A | 11/2010 |
| KR | 10-2012-0011916 A | 2/2012 |
| KR | 10-2013-0111732 A | 10/2013 |
| KR | 10-2013-0127192 A | 11/2013 |
| WO | 2012/064998 A2 | 5/2012 |

OTHER PUBLICATIONS

First Office Action, dated Dec. 18, 2017, regarding Chinese Patent Application No. 201380070428.7, 25 pages.
Motorola, "PDCCH Beamforming for LTE-A", 3GPP TSG RAN1#57, R1-092173, May 2009, 3 pages.
International Search Report dated Mar. 6, 2014 in connection with International Patent Application No. PCT/KR2013/010346, 5 pages.
Written Opinion of the International Searching Authority dated Mar. 6, 2014 in connection with International Patent Application No. PCT/KR2013/010346, 7 pages.
Extended European Search Report dated Jun. 27, 2016 in connection with European Application No. 13855409.2, 8 pages.

* cited by examiner

METHOD AND DEVICE FOR SENDING AND RECEIVING SCHEDULING DATA IN A WIRELESS COMMUNICATION SYSTEM USING BEAMFORMING

CROSS-REFERENCE TO RELATED APPLICATIONS

This application is a continuation of U.S. patent application Ser. No. 14/443,036 filed on May 14, 2015, which is a 371 of International Patent Application No. PCT/KR2013/010346 filed on Nov. 14, 2013, which claims priority to Korean Patent Application No. 10-2012-0128879 filed on Nov. 14, 2012, the disclosures of which are herein incorporated by reference in their entirety.

BACKGROUND

1. Field

The present disclosure relates to a method and apparatus for efficiently transmitting and receiving a scheduling and/or control signal (hereinafter, referred to as scheduling information) to and from a terminal by a plurality of base stations in a wireless communication system.

2. Description of Related Art

With the use of terminals such as smartphones, an average amount of data used by mobile communication users is exponentially increasing, and users' demands for higher data transmission rates are continuously increasing. Generally, a high data transmission rate may be provided by providing communication using a wider frequency band or by improving frequency use efficiency.

However, it is quite difficult to provide a higher average data transmission rate with the latter method, because current-generation communication techniques have already provided frequency use efficiency close to a theoretical limit and thus increasing the frequency usage efficiency beyond the theoretical limit may not be easily achieved by technical improvement. Consequently, a practically probable method for improving a data transmission rate is to provide a data service in a wider frequency band. In this case, an available frequency band needs to be considered.

According to current frequency distribution policies, a wideband communication-possible band over 1 GHz is limited, and a practically selectable frequency band is only a millimeter (mmW) band over 30 GHz. In this high frequency band, unlike in a 2 GHz-band used by conventional cellular systems, signal attenuation with respect to a distance occurs excessively. Due to signal attenuation, for a base station using the same power as a conventional cellular system, service coverage is significantly reduced. To solve a corresponding problem, a beamforming scheme is widely used in which transmission/reception power is concentrated on a small space to improve transmission/reception efficiency of an antenna.

FIG. 1 illustrates a terminal and a base station that provides beamforming using an array antenna.

Referring to FIG. 1, a base station 110 transmits data while changing a direction of a downlink transmission (Tx) beam 111 with the use of a plurality of array antennas Array0 and Array1 for each of cells (or sectors) 101, 103, and 105. A terminal 130 receives data while changing a direction of a reception (Rx) beam 131.

In a system that performs communication by using the beamforming method, the base station 110 and the terminal 130 provide a data service by selecting a direction of a transmission beam and a direction of a reception beam that provide an optimal channel environment from among multiple transmission beam directions and reception beam directions. This process is equally applied to an uplink channel for transmitting data from the terminal 130 to the base station 110 as well as a downlink channel for transmitting data from the base station 110 to the terminal 130.

FIG. 2 illustrates an example in which the base station 110 transmits a signal through a transmission beam having a particular beam width in a system that performs communication using the beamforming scheme.

In FIG. 2, the base station 110 is installed in a position having a predetermined height 201 from the ground, and has a predefined beam width 203. The beam width 203 of the base station 110 may be defined with respect to an elevation angle and an azimuth. In FIG. 2, a transmission beam of the base station 110 is transmitted in a direction corresponding to an elevation angle 205. Although not shown in FIG. 2, the azimuth angle may be understood as a horizontal angle at which the transmission beam propagates.

FIG. 3 shows an example of the number of transmission beams the base station 110 may transmit and the number of reception beams received by the terminal 130 when, in the base station 110 installed in the same manner as in FIG. 2, the height 201 at which the base station 110 is installed is 35 m and the base station 110 transmits a transmission beam having a beam width of 5° with respect to an elevation angle and an azimuth in one sector, for example, having an angle of 30° and a coverage of 200 m. In the example of FIG. 3, ninety six (96) transmission beams having a beam width of 5° with respect to an elevation angle and an azimuth are used to configure one sector having an angle of 30° and a coverage of 200 m.

In a beamforming system, it is difficult for a terminal to form a large number of transmission/reception beams having a narrow beam width like a base station due to limitations in a physical space, performance, and cost. In the example of FIG. 3, the terminal 130 forms four (4) reception beams RX1, RX2, RX3, and RX4 to receive a transmission beam transmitted by the base station 110. In this case, an elevation angle beam width of a reception beam is about 90°.

In the beamforming system, generally, a narrow transmission beam has a high antenna gain, but due to a narrow beam width, communication performance may not be guaranteed if a direction of a transmission beam and a direction of a reception beam deviate from each other. Moreover, due to a limited transmission/reception range, communication may be instantly interrupted if a reflective object or an object through which the beam may not pass is disposed between the transmission beam and the reception beam. This problem is generally defined as a link fragility problem. A widely used method for solving this link fragility problem is that one terminal maintains a data transmission/reception channel with a plurality of base stations.

FIG. 4A illustrates an example in which a plurality of base stations maintain a data transmission/reception channel with a terminal in a general beamforming system.

Referring to FIG. 4A, a terminal 421 groups one or more nearby base stations 411 (Cell-0), 413 (Cell-4), 415 (Cell-5), and 417 (Cell-11) into one serving base station group or cloud cell based on reception signal strengths, and periodically measures signals of the base stations 411, 413, 415, and 417 included in the group to maintain a data transmission/reception channel.

In the example of FIG. 4A, from among the nearby base stations 411, 413, 415, and 417, the beamforming system selects the base station 411 (Cell-0) having the highest signal strength as a serving base station of the terminal 421, and classifies the other base stations 413 (Cell-4), 415 (Cell-5), and 417 (Cell-11) as scheduling candidate base stations. The terminal 421 transmits and receives a control signal and data through the base station 411 (Cell-0) in a normal channel condition, and at the same time, periodically measures signals of the base stations 413 (Cell-4), 415 (Cell-5), and 417 (Cell-11), which are scheduling candidate base stations, to maintain a data transmission/reception channel with the base stations 413 (Cell-4), 415 (Cell-5), and 417 (Cell-11). In this way, in the beamforming system, the terminal 421 may continue data transmission and reception through the other base stations 413 (Cell-4), 415 (Cell-5), and 417 (Cell-11), included in the serving base station group, if a link between the terminal 421 and the base station 411 (Cell-0) is unstable.

In the beamforming system, the terminal generally generates a limited number of transmission/reception beams at a particular transmission/reception instant or time due to limitations in a physical space, performance, and cost. The example of FIG. 4A assumes that the terminal 421 forms one reception beam at every transmission/reception time. The terminal 421 needs to receive scheduling information for data transmission/reception from the base stations 411 (Cell-0), 413 (Cell-4), 415 (Cell-5), and 417 (Cell-11) included in the serving base station group.

When two or more base stations of the serving base station group transmit scheduling information to the terminal 421, the terminal 421 needs to receive scheduling information, transmitted by the base stations 411 (Cell-0), 413 (Cell-4), 415 (Cell-5), and 417 (Cell-11), at different times by using one reception beam. To this end, the scheduling information transmission times of the base stations 411 (Cell-0), 413 (Cell-4), 415 (Cell-5), and 417 (Cell-11) included in the serving base station group need to be defined differently, and the terminal 421 needs to determine whether each base station has transmitted scheduling information at each time. However, defining scheduling times of base stations in a way to avoid collision is generally difficult to achieve, and when the terminal 421 receives scheduling information from each base station included in the serving base station group, power consumption of the terminal 421 increases largely. To solve this problem a particular base station included in the serving base station group is designated as a base station for transmitting and receiving a scheduling and/or control signal for a corresponding terminal. In the example of FIG. 4A, the base station 411 (Cell-0), which is a serving base station, transmits and receives a scheduling and/or control signal for the terminal 421.

FIG. 4B illustrates an example in which a terminal receives a data packet by using a Hybrid Automatic Retransmit Request (HARQ) in a general beamforming system.

Referring to (A) of FIG. 4B, the terminal 421 receives scheduling information from the serving base station 411 (Cell-0), for example, in a subframe 0, to receive a data packet transmitted from the serving base station 411 (Cell-0) indicated by the scheduling information in the subframe.

Referring to (B) of FIG. 4B, it is assumed that the terminal 421 fails in decoding the first data packet. Thereafter, the terminal 421 receives scheduling information from the serving base station 411 (Cell-0) in a subframe 3 to receive the first HARQ packet from the base station 413 (Cell-5) indicated by the scheduling information. Referring to (C) of FIG. 4B, it is assumed that the terminal 421 fails in decoding the first HARQ packet received from the base station 413 (Cell-5). Thereafter, the terminal 421 receives scheduling information from the serving base station 411 (Cell-0) in a subframe 7 to receive the second HARQ packet from the base station 417 (Cell-7) indicated by the scheduling information.

As shown in FIGS. 4A and 4B, if a particular base station of a serving base station group is designated as a base station for transmitting and receiving a scheduling and/or control signal for a corresponding terminal, for an unstable link between the base station and the terminal, transmission and reception of the scheduling and/or control signal may be difficult to perform, hindering data communication from being continued. Even when a channel condition of another base station of the serving base station group is better than the serving base station for transmitting the scheduling and/or control signal, the scheduling and/or control signal needs to be transmitted and received through the serving base station, disturbing optimization of performance of a channel for transmitting and receiving the scheduling and/or control signal.

SUMMARY

The present disclosure provides a method and apparatus for efficiently transmitting scheduling information through a plurality of base stations in a wireless communication system using beamforming.

The present disclosure also provides a method and apparatus for efficiently receiving scheduling information at a terminal from a plurality of base stations in a wireless communication system using beamforming.

In accordance with an aspect of the present disclosure, there is provided a method for receiving scheduling information at a terminal in a wireless communication system using beamforming, the method including receiving scheduling information from a first base station through a first scheduling channel and receiving scheduling information from at least one second base stations cooperating with the first base station through at least one second scheduling channels by using at least one reception beams.

In accordance with another aspect of the present disclosure, there is provided a terminal for receiving scheduling information in a wireless communication system using beamforming, the terminal including a receiver configured to receive data from a first base station and at least one second base stations over a wireless network and a controller configured to control operations of receiving scheduling information from a first base station through a first scheduling channel, and receiving scheduling information from the at least one second base stations cooperating with the first base station through at least one second scheduling channels by using at least one reception beams.

In accordance with another aspect of the present disclosure, there is provided a method for transmitting scheduling information at a base station in a wireless communication system using beamforming, the method including negotiating scheduling for a terminal with at least one base stations cooperating with the base station and transmitting scheduling information through a scheduling channel determined from among a first scheduling channel and at least one second scheduling channels according to a result of the negotiation, in which each of the first scheduling channel and the at least one second scheduling channels is set for each reception beam of the terminal.

In accordance with another aspect of the present disclosure, there is provided a base station for transmitting scheduling information in a wireless communication system using beamforming, the base station including a transmitter/receiver configured to transmit and receive data over a wireless network, a communication interface configured to communicate with at least one base stations cooperating with the base station, and a controller configured to control operations of negotiating scheduling for a terminal with the at least one base stations and transmitting scheduling information through a scheduling channel determined from among a first scheduling channel and at least one second scheduling channels according to a result of the negotiation, in which each of the first scheduling channel and the at least one second scheduling channels is set for each reception beam of the terminal.

DETAILED DESCRIPTION

Figure 1:
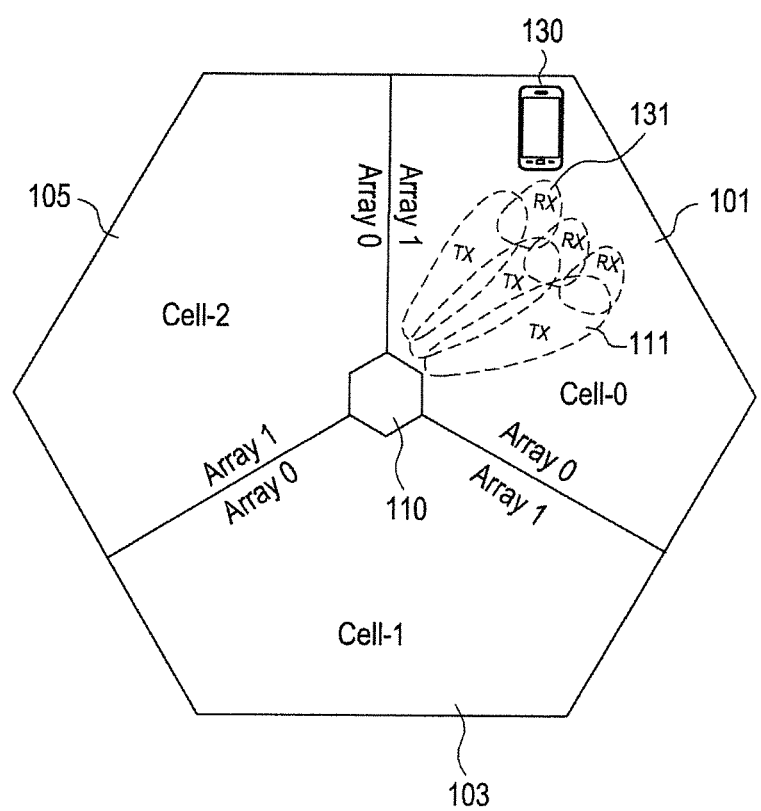
FIG. 1 illustrates a general beamforming system including a base station for providing beamforming using an array antenna and a terminal.
Figure 2:
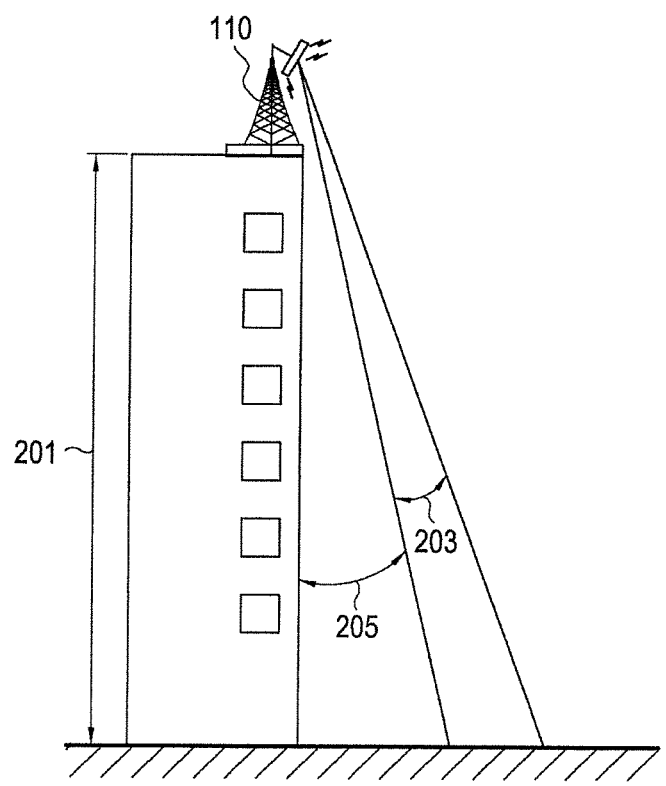
FIG. 2 illustrates an example in which a base station transmits a signal through a transmission beam having a particular beam width in a general beamforming system.
Figure 3:
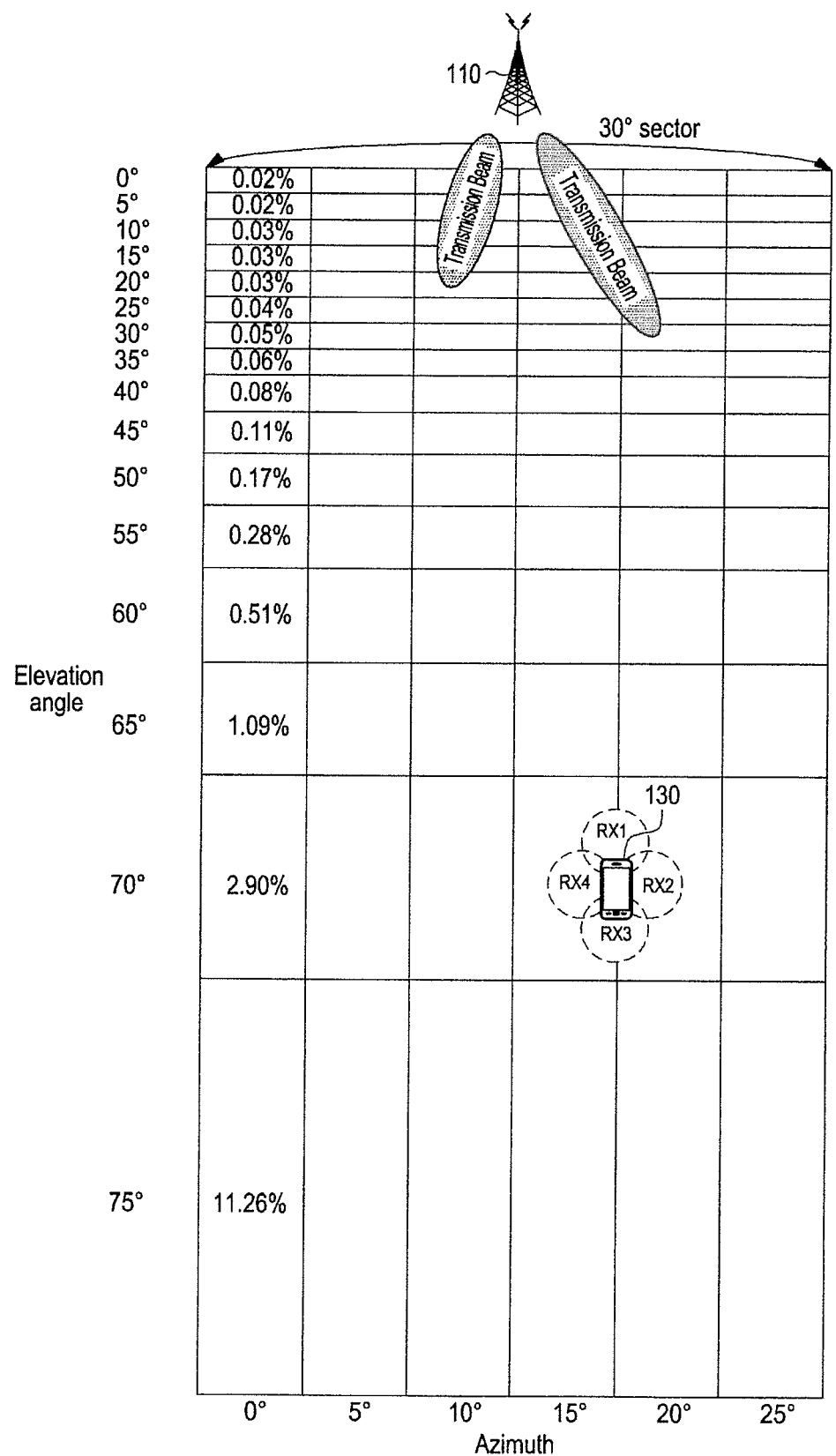
FIG. 3 illustrates an example of the number of transmission beams a base station may transmit and the number of reception beams received by a terminal in a general beamforming system.
Figure 4A:
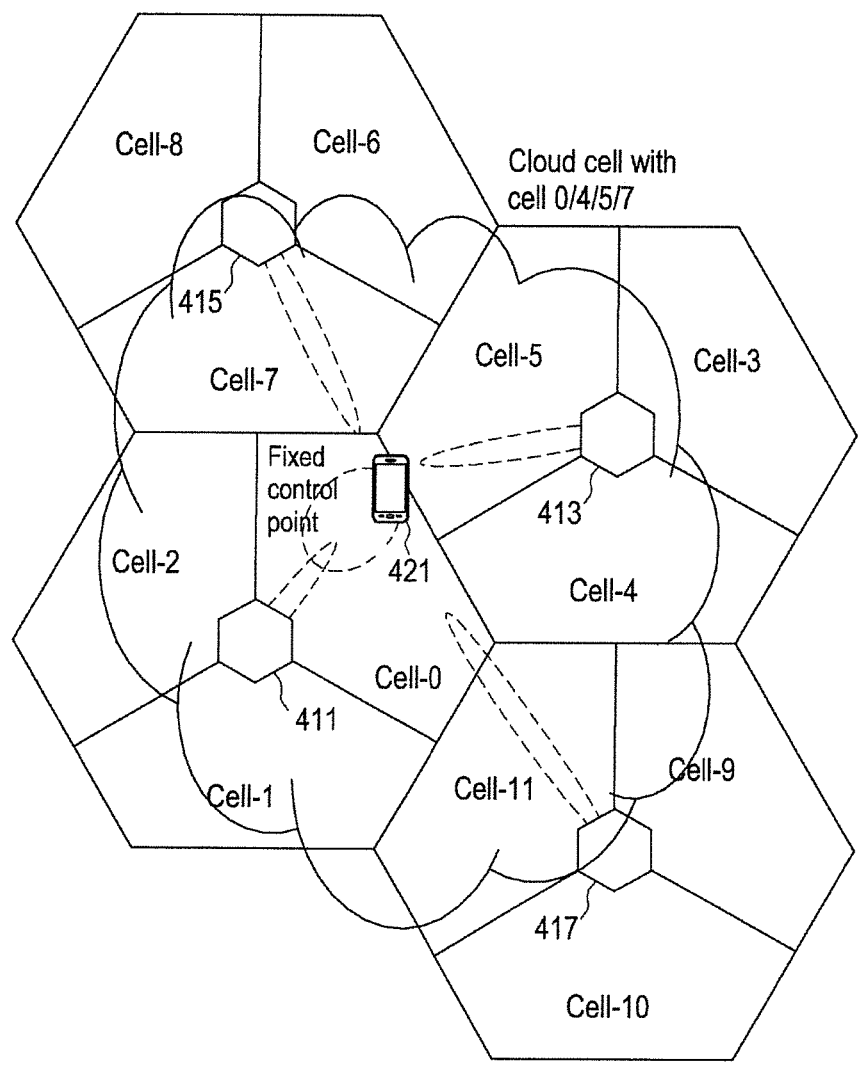
FIG. 4A illustrates an example in which a plurality of base stations maintain a data transmission and reception channel with a terminal in a general beamforming system.
Figure 4B:
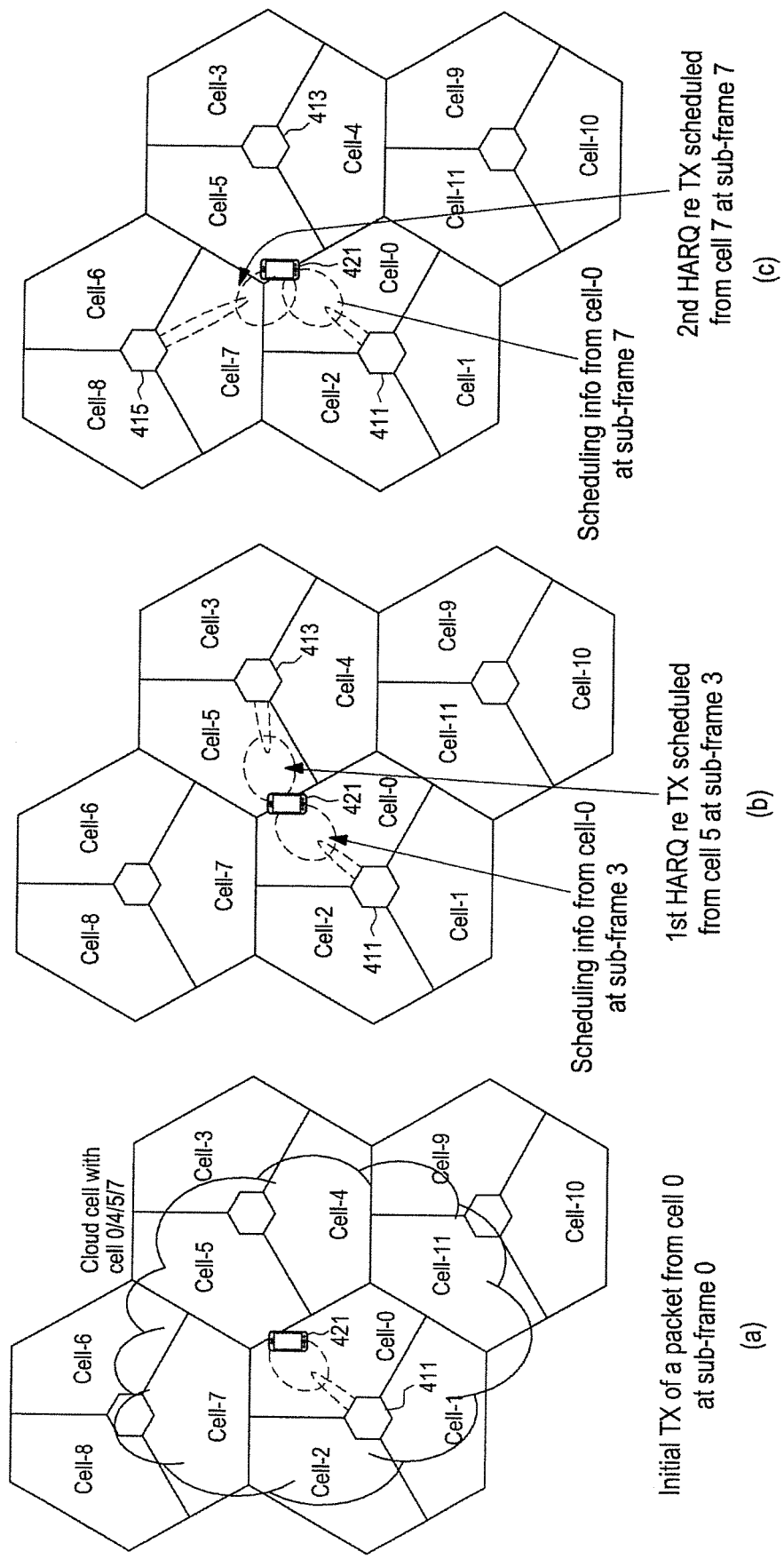
FIG. 4B illustrates an example in which a terminal receives a data packet by using HARQ in a general beamforming system.

Hereinafter, various embodiments of the present disclosure will be described in relation to the accompanying drawings. In the following description, a detailed description of known functions and configurations incorporated herein will be omitted when it may obscure the subject matter of the present disclosure.

An embodiment of the present disclosure proposes a scheme in which a plurality of base stations may efficiently transmit and receive a scheduling and/or control signal (hereinafter, referred to as scheduling information) to and from one terminal in a system using beamforming. To this end, in an embodiment of the present disclosure, a method is proposed in which in addition to a main scheduling and/or control channel (hereinafter, referred to as a main scheduling channel) through which a serving base station transmits a scheduling and/or control signal to a particular terminal, a sub-scheduling and/or control channel (hereinafter, referred to as a sub-scheduling channel) is set for each reception beam direction of the terminal. The sub-scheduling channel defined for each reception beam direction of the terminal may be transmitted and received using different times, frequency resources, and transmission and reception beams.

An embodiment of the present disclosure also proposes a method in which when a particular base station transmits a scheduling and/or control signal to the terminal, the base station transmits the scheduling and/or control signal through a (main or sub) scheduling and/or control channel corresponding to an optimal reception beam between the base station and the terminal. An embodiment of the present disclosure also proposes a method in which when the base station is a serving base station of the terminal, the base station transmits a scheduling and/or control signal by using a main scheduling channel; if the base station is not the serving base station, the base station transmits a scheduling and/or control signal (hereinafter, referred to as scheduling information) through an optimal (main or sub) scheduling and/or control channel.

An embodiment of the present disclosure proposes a method for transmitting, by the serving base station, a not-scheduled indication indicating that the terminal is not scheduled through the main scheduling channel, if the terminal is not scheduled by any base station at a particular scheduling time.

An embodiment of the present disclosure also proposes a method for effectively receiving, by the terminal, a scheduling and/or control signal transmitted from a different base station by using a main scheduling channel and a sub-scheduling channel defined for each reception beam of the terminal. An embodiment of the present disclosure also proposes a method for receiving, by the terminal, a sub-scheduling channel defined for each reception beam direction in a different time or frequency resource by using a reception beam corresponding to the channel. An embodiment of the present disclosure also proposes a method for measuring, by the terminal, an optimal transmission/reception beam for each base station and periodically reporting the information to each base station.

An embodiment of the present disclosure also proposes a method for omitting reception of a sub-scheduling channel of the terminal, if collision occurs in data transmission/reception region and time, frequency, and transmission and reception beams scheduled to the terminal. The present disclosure also proposes a method for omitting reception of every sub-scheduling channel if the terminal receives a not-scheduled indication through the main scheduling channel.

An embodiment of the present disclosure proposes a method for transmitting, by multiple base stations, scheduling information to a terminal through multiple scheduling channels. Thus, the main scheduling channel and the sub-scheduling channel may be understood as distinguishing scheduling channels transmitted by different base stations. Depending on a role of a scheduling channel, the main scheduling channel and the sub-scheduling channel may also be understood as the main scheduling channel playing a main role and the sub-scheduling channel playing a sub-role. In the following description, transmission and reception of a scheduling channel will be described for convenience and will be understood as transmission and reception of scheduling information through the scheduling channel.

That is, it should be noted that the terms, the main scheduling channel and the sub-scheduling channel described in an embodiment of the present disclosure are intended for convenience of the description, and the terms do not limit the role of the scheduling channel.

Figure 5:
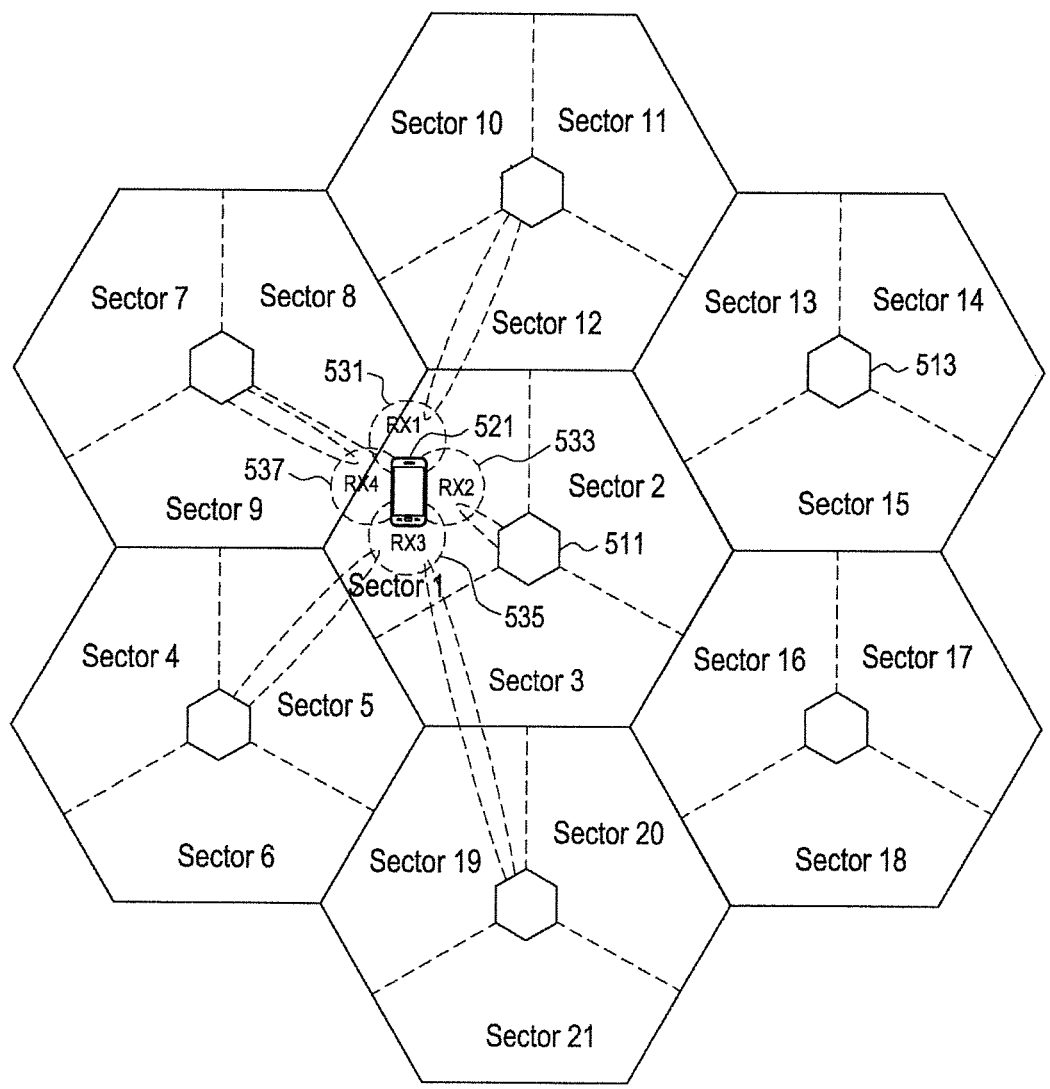
FIG. 5 illustrates an example of a scheduling channel for each reception beam direction of a terminal in a wireless communication system using beamforming according to an embodiment of the present disclosure.

FIG. 5 illustrates an example of a scheduling channel for each reception beam direction of a terminal in a wireless communication system using beamforming according to an embodiment of the present disclosure.

In the example of FIG. 5, a terminal 521 has directions of four reception beams RX1 through RX4 531, 533, 535, and 537, and the closest Sector 1 among base stations is a serving base station 511 of the terminal 521. The terminal 521 receives a main scheduling channel transmitted by Sector 1, which is the serving base station 511, through the reception beam RX2 533 that is optimal for Sector 1. In addition, the terminal 521 receives a sub-scheduling channel defined for each reception beam direction by using the respective reception beams RX1 through RX4 531, 533, 535, and 537. For the reception beam RX2 533 through which the terminal 521 receives the main scheduling channel, a sub-scheduling channel may not be separately defined. In this case, the terminal 521 may receive a scheduling and/or control signal transmitted by a base station other than the serving base station (for example, a base station 513 in the direction of the reception beam RX2 in FIG. 5) through a resource region of the main scheduling channel by using the reception beam RX2.

Figure 6:
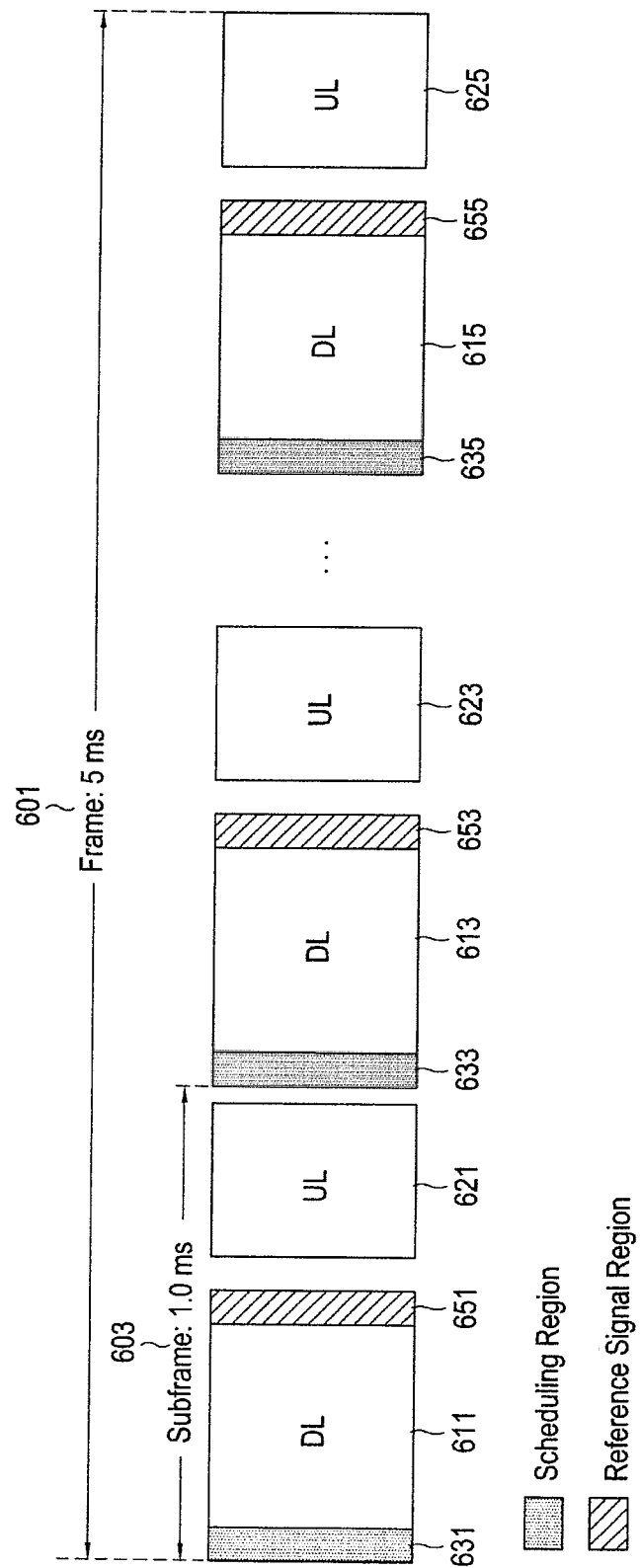
FIG. 6 illustrates an example of a frame structure for transmitting and receiving a signal in a wireless communication system using beamforming according to an embodiment of the present disclosure.

FIG. 6 illustrates an example of a frame structure for transmitting and receiving a signal in a wireless communication system using beamforming according to an embodiment of the present disclosure.

Referring to FIG. 6, one frame 601 has a length of, for example, 5 ms, and includes five sub-frames 603. Herein, the length of the frame 601 and the number of sub-frames 603 are merely examples, and the embodiment of the present disclosure is not limited to the embodiment of FIG. 6.

Each sub-frame 603 is divided into downlinks 611, 613, and 615 through which a base station transmits a signal to a terminal and uplinks 621, 623, and 625 through which the terminal transmits a signal to the base station. Referring to FIG. 6, some of the downlinks 611, 613, and 615 are used as scheduling regions 631, 633, and 635 for transmitting scheduling information, and some of the downlinks 611, 613, and 615 are used as reference signal regions 651, 653, and 655 for transmitting a downlink reference signal.

Figure 7A:
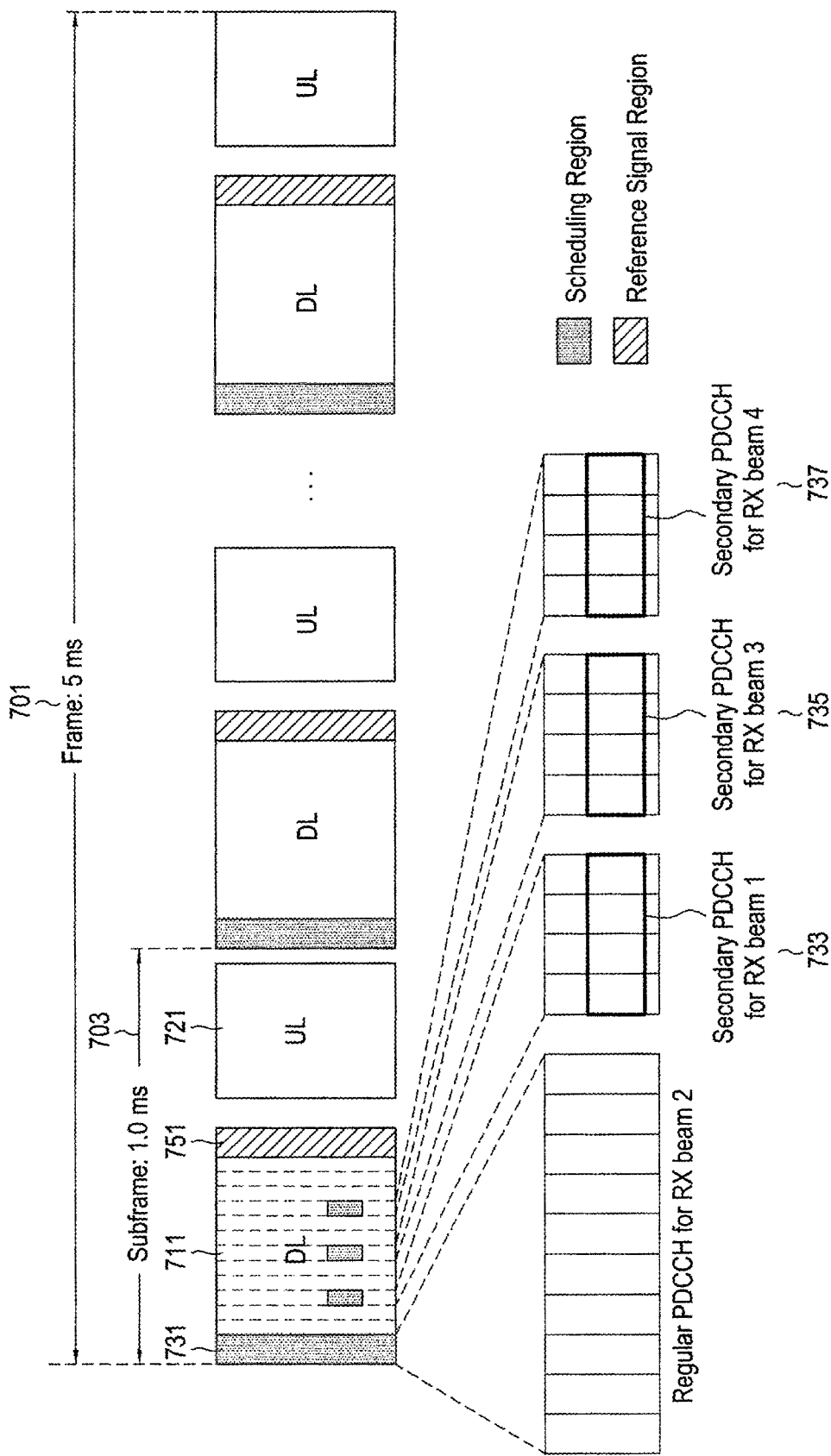
FIGS. 7A and 7B illustrate a sub-scheduling channel for each reception beam direction of a terminal according to an embodiment of the present disclosure by using a frame structure of FIG. 6.
Figure 7B:
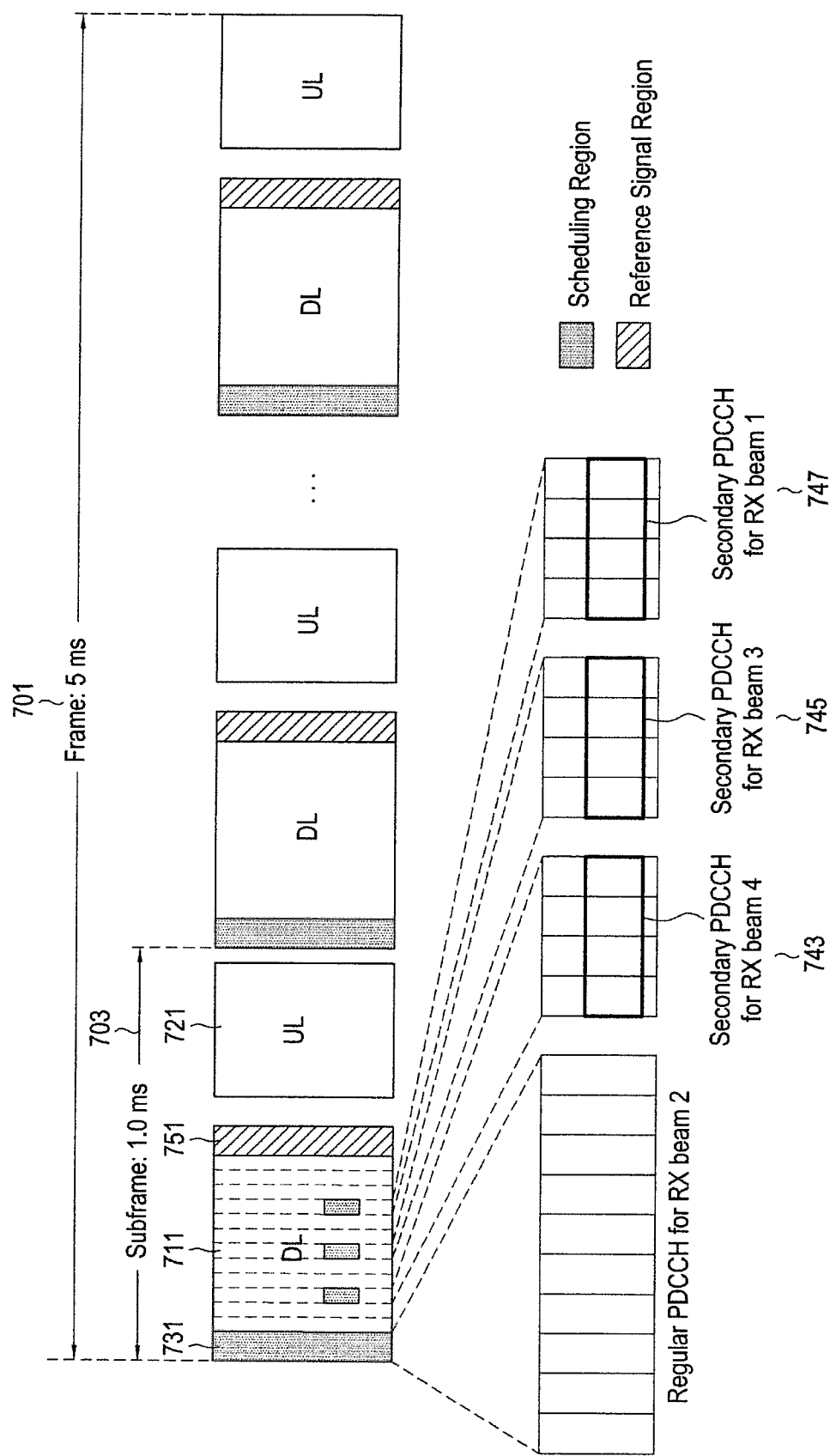

FIGS. 7A and 7B describe a sub-scheduling channel for each reception beam direction of a terminal by using the frame structure of FIG. 6.

The basic structure of a frame 701 illustrated in FIGS. 7A and 7B is the same as that of the frame 601 described in FIG. 6. That is, one frame 701 has a length of, for example, 5 ms, and includes five sub-frames 703. Each sub-frame 703 is divided into a downlink 711 in which a base station transmits a signal to the terminal and an uplink 721 in which the terminal transmits a signal to the base station. A part of the downlink 711 is used as a reference signal region 751 for transmitting a downlink reference signal.

In the following embodiments, main/sub scheduling channels and a region where the main/sub scheduling channels are transmitted will be given the same reference numbers for convenience.

Although only scheduling channels (that is, the scheduling regions 631, 633, and 635) have been used to transmit scheduling information in the embodiment of the present disclosure, the embodiment of FIGS. 7A and 7B may transmit a scheduling and/or control signal by using a channel for transmitting and receiving a general control signal and a resource region of the channel, as well as the scheduling channel.

A scheduling region 731 of FIG. 7A is a region where a scheduling channel used for transmitting scheduling information to a terminal from a base station is transmitted in a frame structure, and in the current embodiment, this channel (region) will be defined as a main scheduling channel. The terminal receives the main scheduling channel 731 by using a reception beam that is optimal for the serving base station. In the embodiment of FIG. 7A, the reception beam that is optimal for the terminal for the serving base station is assumed to be, for example, the reception RX beam 2 533 in the embodiment of FIG. 5. The terminal receives the main scheduling channel 731 by using the reception beam RX2 533. In the current embodiment, sub-scheduling channels 733, 735, and 737 are set for each reception beam direction of the terminal. For example, in FIG. 7A, a reference numeral 733 indicates a region where a sub-scheduling channel for the reception RX beam 1 of the terminal is transmitted, a reference numeral 735 indicates a region where a sub-scheduling channel for the reception RX beam 3 of the terminal is transmitted, and a reference number 737 indicates a region where a sub-scheduling channel for the reception RX beam 4 of the terminal is transmitted.

The terminal receives sub-scheduling channels 733, 735, and 737 defined for respective reception beam directions in addition to the main scheduling channel 731 by using reception beams corresponding to respective scheduling channels, thus effectively receiving a scheduling and/or control signal transmitted by different nearby base stations of the terminal. In the example of FIG. 7A, a sub-scheduling channel is not separately defined for a reception beam RX2 in which the terminal receives the main scheduling channel 731. In this case, the terminal may receive a scheduling channel transmitted by a base station other than a serving base station through a resource region of the main scheduling channel 731 by using the reception beam RX2. Although the sub-scheduling channels 733, 735, and 737 for each reception beam of the terminal are set at different times by using the same frequency resource in FIG. 7A, the sub-scheduling channels 733, 735, and 737 may be set on different frequency resources.

In the embodiment of FIG. 7A, a sub-scheduling channel for each reception beam of the terminal may be set, considering a serving base station group (or a cloud cell) near the terminal and channel states of base stations included in the serving base station group. More specifically, in a method proposed in the present invention, based on optimal reception beams measured for respective base stations (serving base station or scheduling candidate base stations) included in the serving base station group and reception performances thereof, the sub-scheduling channel may be more preferentially set on time and frequency resources for a reception beam through which scheduling information transmitted from a base station having a superior reception performance is received.

FIG. 7B illustrates another example in which for a terminal located in a position illustrated in FIG. 5, a sub-scheduling channel is set for each reception beam direction, considering the channel states of the base stations included in the serving base station group of the terminal. In FIG. 7B, the same reference numerals as in FIG. 7A correspond to the same description as in FIG. 7A and thus will not be described in detail.

In the example of FIG. 5, it is assumed that the serving base station group of the terminal includes Sector 1, Sector 5, Sector 9, and Sector 12, and strengths of signals transmitted from respective base stations are Sector 1, Sector 9, Sector 5, and Sector 12 in highest-to-lowest order. It is also assumed that Sector 1 has the highest reception strength when receiving a signal using the reception beam 2 RX2 533, Sector 9 has the highest reception strength when receiving a signal using the reception beam 4 RX4 537, Sector 5 has the highest reception strength when receiving a signal using the reception beam 3 RX3 535, and Sector 12 has the highest reception strength when receiving a signal using the reception beam 1 RX1 531. In the example, the base station 511 of Sector 1 having the best signal reception performance for the terminal may be selected as a serving base station, and in this case, base stations of the other Sectors 5, 9, and 12 are scheduling candidate base stations. In the foregoing example, the terminal receives a main scheduling channel by using the reception beam 2 RX2 533 that is optimal for the base station 511 of Sector 1, which is the serving base station, and receives a sub-scheduling channel that is set for each reception beam by using the other reception beams 1, 3, and 4 531, 535, and 537. In the foregoing example, when the sub-scheduling channel is set for each reception beam, the sub-scheduling channel may be more preferentially set on time and frequency resources for a reception beam through which scheduling information transmitted from a base station having a superior reception performance. For example, in the embodiment of FIG. 7B, a sub-scheduling channel for Sector 9 having the strongest received signal, except for the signal from the serving base station of the terminal, and for the reception beam 4 RX4 537, which is the optimal reception beam for Sector 9, is set in a region 743 more preferentially in terms of time than sub-scheduling channels for the other reception beams. In the embodiment of FIG. 7B, a sub-scheduling channel for Sector 9 having the strongest received signal except for the signal from the serving base station of the terminal and for the reception beam 4 RX4 537, which is the optimal reception beam for Sector 9, is set in the region 743 more preferentially in terms of time than sub-scheduling channels for the other reception beams. Also, in the embodiment of FIG. 7B, a sub-scheduling channel for Sector 5 having the strongest received signal next to Sector 9 and the reception beam 3, which is the optimal reception beam for Sector 5, is set in a region 745 next to the sub-scheduling channel for the reception beam 4. Last, the sub-scheduling channel for the reception beam 1 is set in a region 747.

When a sub-scheduling channel is set for each reception beam of a terminal according to a method proposed by the present disclosure, a base station may transmit a scheduling and/or control signal through a (main or sub) scheduling channel corresponding to the optimal reception beam between the base station and the terminal. If the base station is a serving base station of the terminal, the base station transmits a scheduling and/or control signal to the terminal by using the main scheduling channel; on the other hand, if the base station is not the serving base station of the terminal, the base station may transmit the scheduling and/or control signal through the optimal (main or sub) scheduling channel.

In addition, according to a method proposed in the present disclosure, when a sub-scheduling channel is set for each reception beam of the terminal, the terminal may receive a scheduling and/or control signal transmitted by a different base station by using a main scheduling channel and a sub-scheduling channel defined for each reception beam of the terminal. In a method proposed by the present disclosure, to help the base station to select a sub-scheduling channel, the terminal needs to measure the optimal transmission/reception beams for respective base stations included in the serving base station group and to periodically report the information to each base station. In the method proposed in the present disclosure, if a particular sub-scheduling channel collides with a data transmission/reception region scheduled for the terminal in terms of time, frequency, and transmission/reception beams, then reception of the sub-scheduling channel may be skipped.

Figure 8:
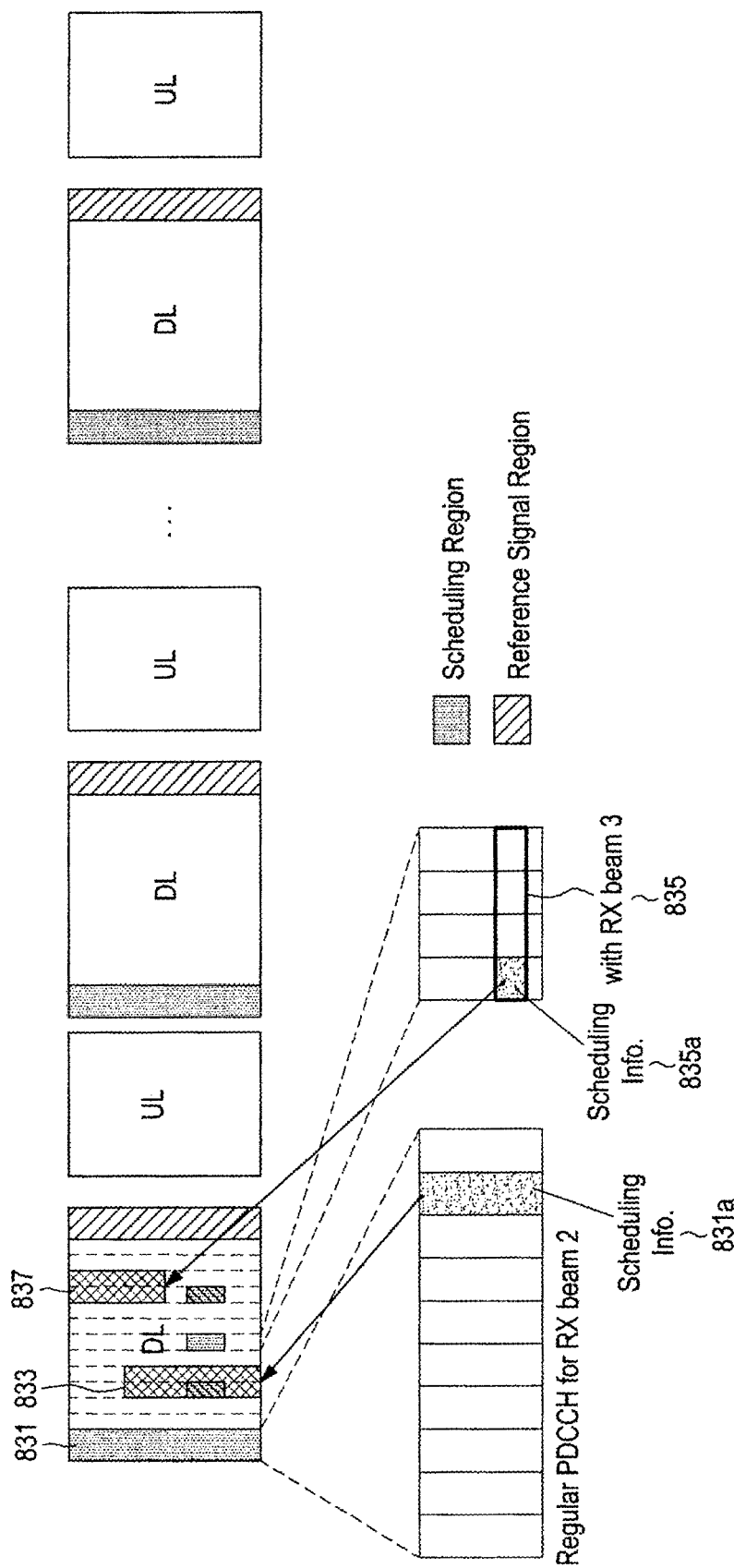
FIG. 8 illustrates an example in which different base stations schedule data transmission for a terminal in a sub-scheduling channel according to an embodiment of the present disclosure.

FIG. 8 illustrates an example in which different base stations schedule data transmission and reception for a terminal in a sub-scheduling channel according to an embodiment of the present disclosure.

In the example of FIG. 8, the sub-scheduling channel is assumed to be set as in the example of FIG. 7B.

Referring to FIG. 8, the terminal receives scheduling information for data transmission and reception from a serving base station through a main scheduling channel 831. Herein, the scheduling information received through the sub-scheduling channel 831 is assumed to include information 831a necessary for data reception in a region 833. The terminal receives data from a serving base station in the region 833 based on scheduling information received through the information 831a, and skips reception of a sub-scheduling channel for the reception beam 4 RX4 (see 743 of FIG. 7B) overlapping with the region 833. After receiving data of the region 833, the terminal may continue attempting reception of the sub-scheduling channel in the remaining resource region.

In the example of FIG. 8, the terminal may receive scheduling information for data transmission and reception from a base station other than the serving base station through a region 835 of a sub-scheduling channel for the reception beam 3 RX3 (see 745 of FIG. 7B). The scheduling information received in the region 835 is assumed to include scheduling information 835a necessary for data reception in a region 837. In this case, the terminal receives data in the region 837 according to the scheduling information 835a received through the region 835, and skips reception of a sub-scheduling channel overlapping with the region 837.

Figure 9:
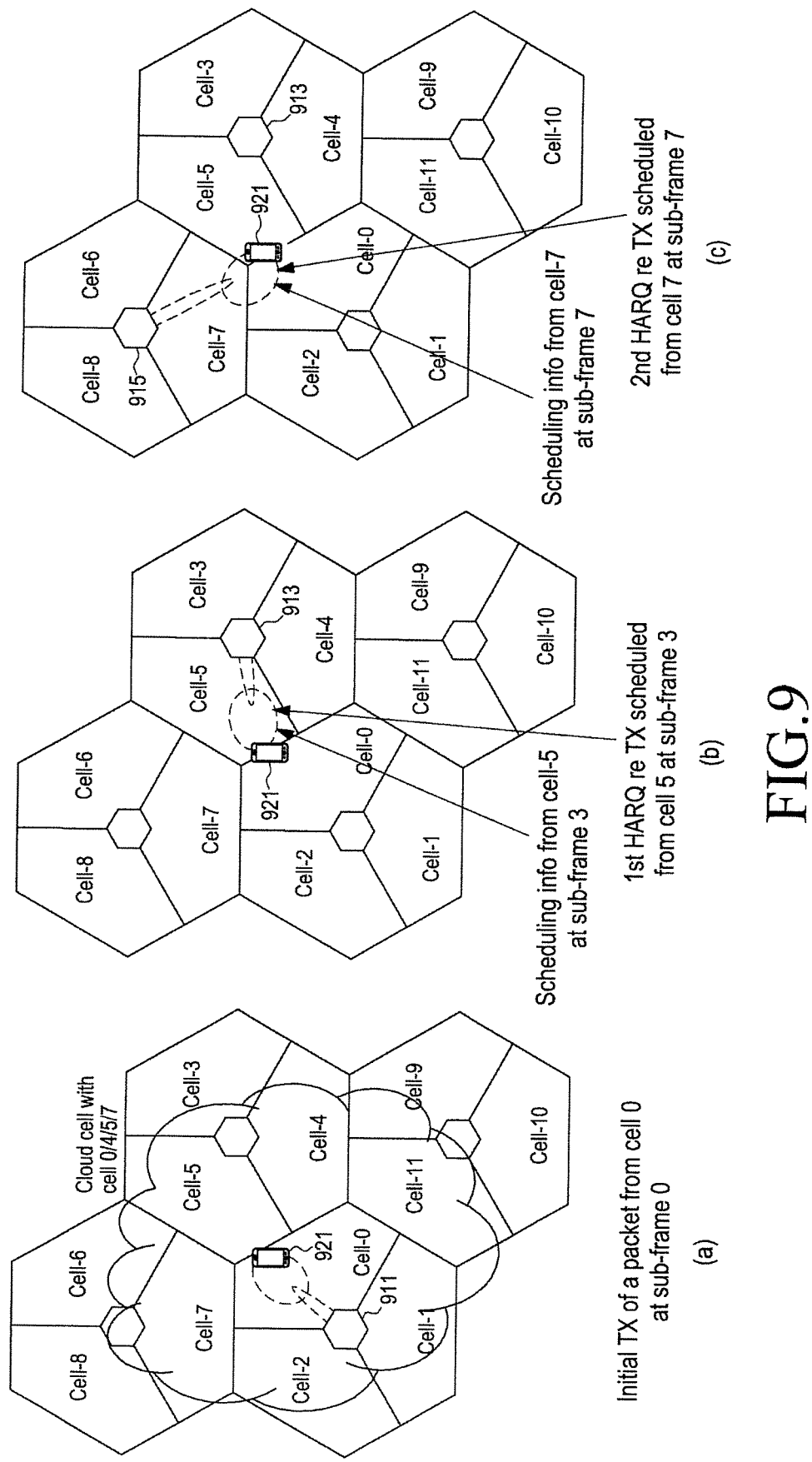
FIG. 9 illustrates an example in which a terminal receives a data packet by using HARQ in a wireless communication system using beamforming according to an embodiment of the present disclosure.

FIG. 9 illustrates an example in which a terminal receives a data packet through a Hybrid Automatic Retransmit Request (HARQ) in a beamforming system according to an embodiment of the present disclosure. In the embodiment of FIG. 9, the terminal receives a data packet from base stations included in the serving base station group by using the HARQ scheme.

Referring to (A) of FIG. 9, a terminal 921 receives scheduling information from a serving base station 911 (Cell-0) through a sub-scheduling channel in a first sub-frame among multiple sub-frame forming a frame, and receives a data packet according to the scheduling information. In the example of FIG. 9, the terminal 921 is assumed to fail in decoding the first data packet. Thereafter, the terminal 921 receives scheduling information in a second sub-frame from a base station 913 (Cell-5) through a sub-scheduling channel as shown in (B) of FIG. 9, and receives the first HARQ packet from the base station 913 (Cell-5) according to the scheduling information. In (C) of FIG. 9, the terminal 921 is assumed to fail in decoding the first HARQ packet. Thereafter, the terminal 921 receives scheduling information in a third sub-frame from the base station 913 (Cell-7) through a sub-scheduling channel, and receives the second HARQ packet from the base station 913 (Cell-5).

Figure 10:
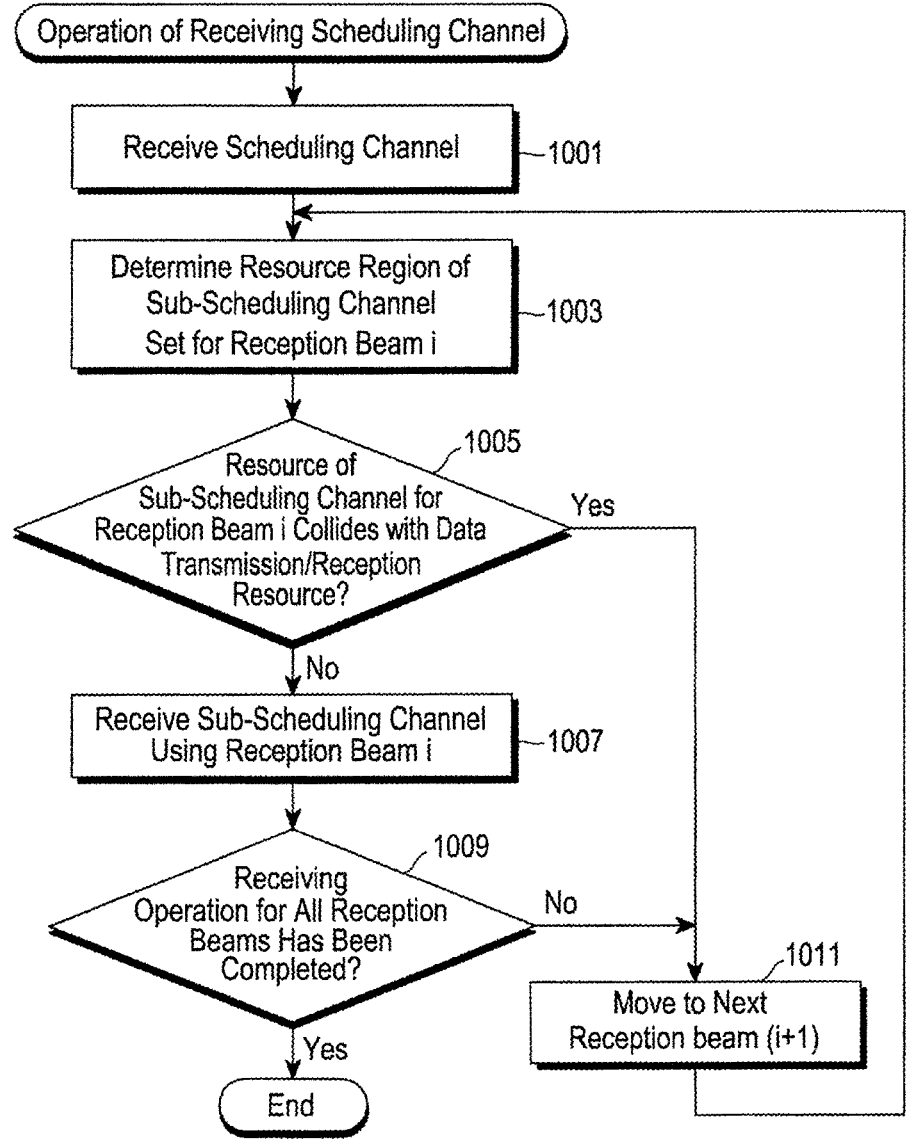
FIG. 10 is a flowchart illustrating a terminal's operation of receiving scheduling information through a reception-beam-specific sub-scheduling channel according to an embodiment of the present disclosure.

FIG. 10 is a flowchart illustrating a terminal's operation of receiving scheduling information through a reception-beam-specific sub-scheduling channel according to an embodiment of the present disclosure.

Referring to FIG. 10, the terminal receives a main scheduling channel from a serving base station in operation 1001. To receive the main scheduling channel in operation 1003, the terminal uses an optimal reception beam through which a signal from the serving base station is received at the highest strength. Thereafter, the terminal performs operations 1003 through 1009 for each reception beam.

More specifically, the terminal determines at least one (hereinafter, referred to as "a resource of a sub-scheduling channel") of time, frequency, and transmission/reception beam resource information resources that are set in advance for a reception beam i (herein, "i" indicates an index of each reception beam) in operation 1003, and determines whether the resource of the sub-scheduling channel collides with a data transmission/reception resource scheduled for the terminal in operation 1005.

If the resource of the scheduling channel for the reception beam i collides with a data transmission/reception resource scheduled for the terminal in operation 1005, the terminal skips reception of the sub-scheduling channel and goes to operation 1003 to repeat subsequent operations. If the resource of the scheduling channel for the reception beam i does not collide with a data transmission/reception resource scheduled for the terminal in operation 1005, the terminal receives a sub-scheduling channel in the resource of the sub-scheduling channel determined in operation 1003 by using the reception beam i in operation 1007. Thereafter, in operation 1009, the terminal determines whether the reception operation has completed for all reception beams, and if the reception operation has completed for all reception beams, the terminal terminates the reception operation for the scheduling channel.

If the reception operation for the sub-scheduling channel has not be completed for all reception beams in operation 1009, the terminal goes to operation 1011 to perform operations 1003 through 1009 with respect to the next reception beam (i+1).

Although the reception operation is performed for all reception beams the terminal may receive in the current embodiment, this description merely corresponds to an embodiment, and in another embodiment, if reception of a main scheduling channel is successful, the terminal may not receive the sub-scheduling channel or may receive the sub-scheduling channel for at least one of all reception beams, which correspond to received signal strengths higher than a predetermined value.

Figure 11:
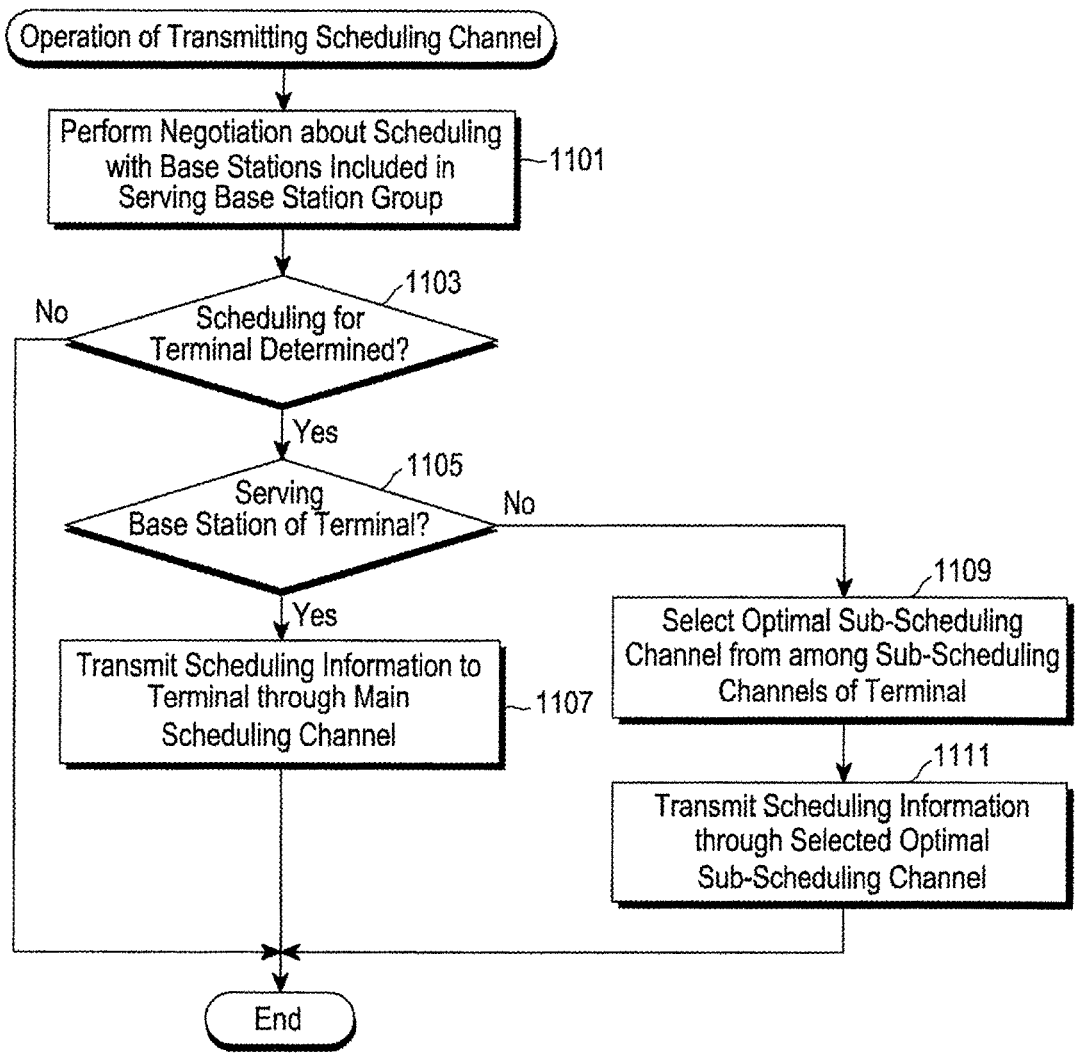
FIG. 11 is a flowchart illustrating a base station's operation of transmitting scheduling information through a reception-beam-specific sub-scheduling channel according to an embodiment of the present disclosure.

FIG. 11 is a flowchart illustrating a base station's operation of transmitting scheduling information through a reception-beam-specific sub-scheduling channel according to an embodiment of the present disclosure.

Although an operation performed for one terminal is illustrated in the embodiment of FIG. 11, a base station repeats the operation illustrated in FIG. 11 for all terminals including the base station as a scheduling candidate base station in a serving base station group.

Referring to FIG. 11, in operation 1101, for a terminal, a base station performs negotiation about scheduling with other base stations included in a serving base station group of the terminal. The negotiation may include, as negotiation subjects, a base station for transmitting and receiving data and scheduling information, data transmission and reception times, resources to be used for data transmission and reception, transmission and reception beams to be used for data transmission and reception, multi-antenna setting information to be used for data transmission and reception, and so forth. If scheduling information for the terminal is determined to be transmitted from the base station in operation 1103 as a result of the negotiation in operation 1101, that is, if scheduling for the terminal is determined, the base station determines whether the base station is a serving base station of the terminal in operation 1105. If the base station is the serving base station of the terminal, the base station transmits scheduling information negotiated in operation 1101 through a main scheduling channel in operation 1107. The scheduling information may include at least one of data transmission and reception times, resource information used for data transmission and reception, transmission and reception beam information, multi-antenna setting information to be used for data transmission and reception, and so forth.

If the base station is not the serving base station of the terminal in operation 1105, the base station selects, from among sub-scheduling channels of the terminal, an optimal sub-scheduling channel through which the terminal may receive a signal of the base station in the best manner, based on a measurement result of a received signal of a serving base station group that the terminal has periodically reported, and recognizes a resource region in which the selected sub-scheduling channel is set, in operation 1109. Thereafter, in operation 1111, the base station transmits scheduling information of the terminal, which is negotiated in operation 1101, in the selected sub-scheduling channel and the resource region in which the sub-scheduling channel is set. The scheduling information may include at least one of data transmission and reception times, resources to be used for data transmission and reception, transmission and reception beams to be used for data transmission and reception, multi-antenna setting information to be used for data transmission and reception, and so forth.

In another embodiment of the present disclosure, a method is proposed in which when a sub-scheduling channel is set for each reception beam of a terminal, if base stations have not scheduled a particular terminal at a particular time or have not transmitted a control signal for the terminal, a not-scheduled indication indicating that the terminal is not scheduled through a main scheduling channel of the serving base station is transmitted to the terminal to reduce the terminal's burden of unnecessarily the sub-scheduling channel. In another embodiment of the present disclosure, a method is proposed in which if the non-scheduled indication indicating that the terminal is not scheduled through the main scheduling channel is received, reception of any sub-scheduling channel is omitted.

Figure 12:
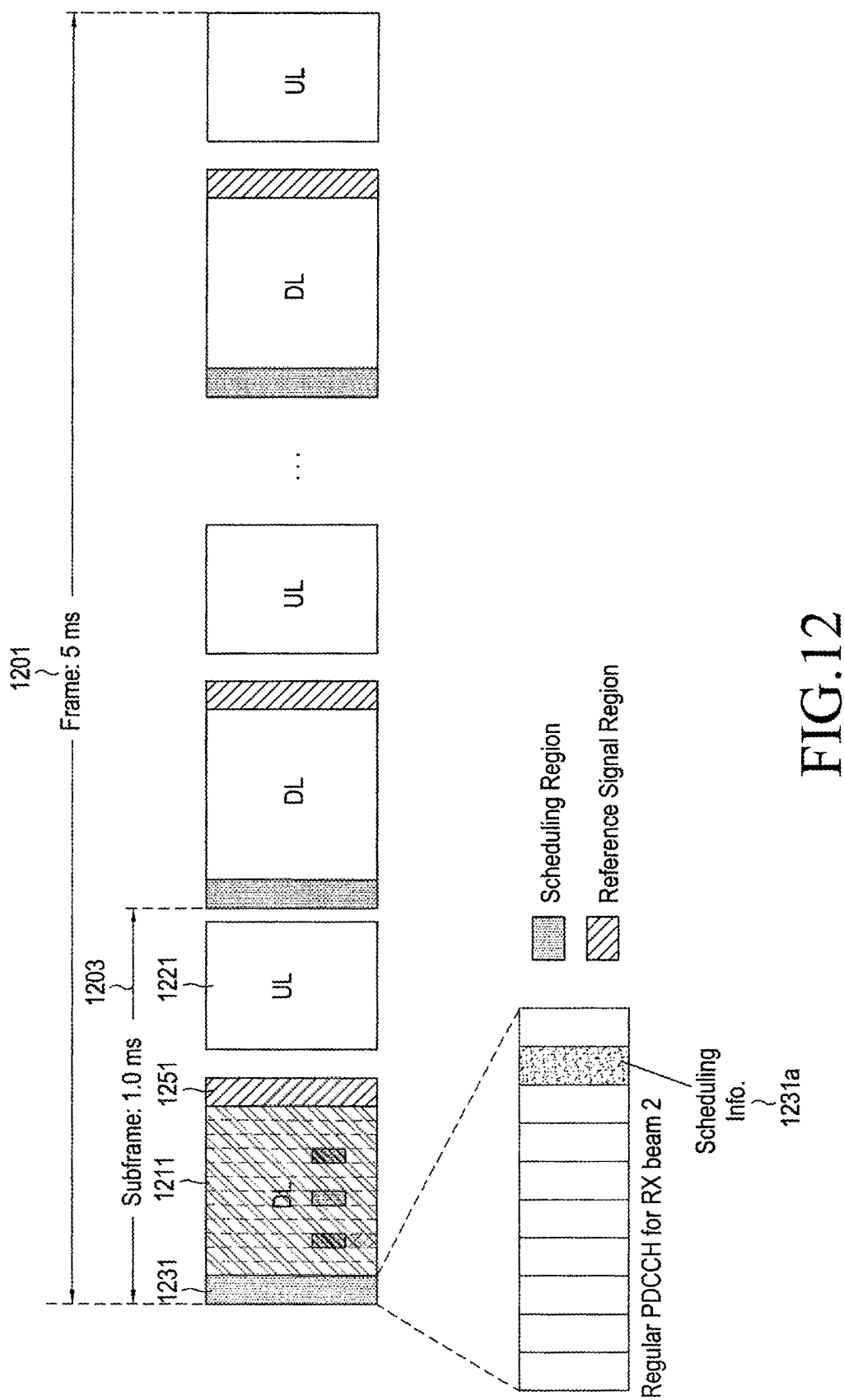
FIG. 12 illustrates an example of a frame structure according to another embodiment of the present disclosure.

FIG. 12 illustrates an example of a frame structure according to another embodiment of the present disclosure.

A basic structure of a frame 1201 illustrated in FIG. 12 is the same as the structure of the frame 701 described with reference to FIG. 7A. That is, one frame 1201 may, for example, have a length of 5 ms and five sub-frames 1203. Each sub-frame 1203 is divided into a downlink 1211 for transmitting a signal from a base station to a terminal and an uplink 1221 for transmitting a signal from the terminal to the base station. A scheduling region 1231 is a region in the frame structure in which a main scheduling channel used for transmission of scheduling information from the base station to the terminal is transmitted, and a part of the downlink 1221 is used as a reference signal region 1251 for transmitting a downlink reference signal.

With reference to FIG. 12, a description will be made of another embodiment of the present disclosure in which a not-scheduled indication indicating a particular terminal is not scheduled is transmitted and received. In a method proposed in the current embodiment, if base stations do not schedule the terminal at a particular time or do not transmit a control signal to the terminal, then a serving base station of the terminal transmits a not-scheduled indication 1231a indicating that the terminal is not scheduled, through the main scheduling channel 1231 of FIG. 12. The terminal having received the not-scheduled indication 1231a through the main scheduling channel 1231 skips the operation of receiving a sub-scheduling channel in a sub-frame.

Figure 13:
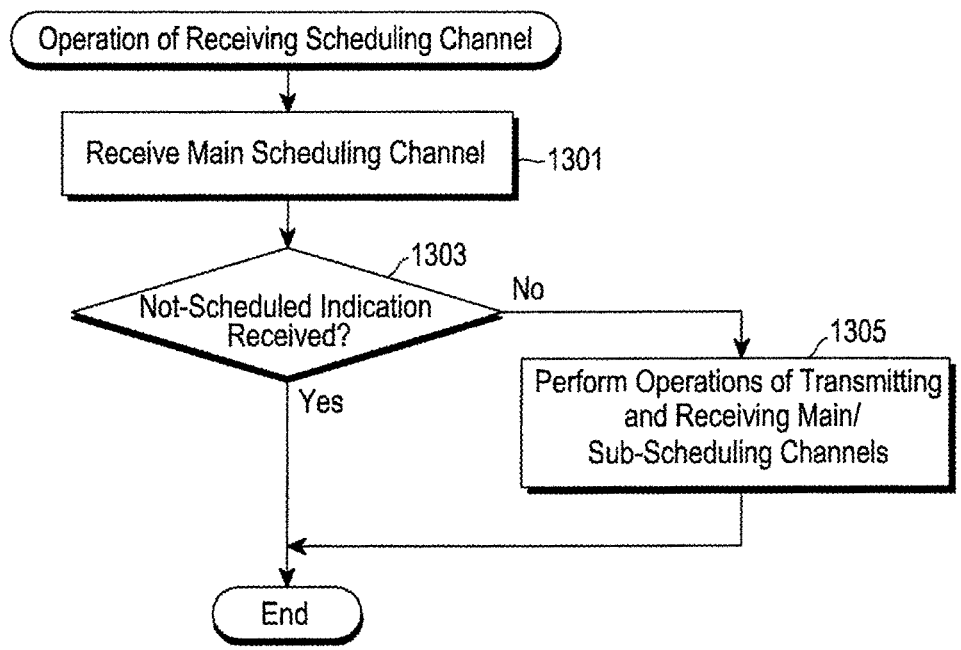
FIG. 13 is a flowchart illustrating a terminal's operation of receiving scheduling information through a scheduling channel according to another embodiment of the present disclosure.

FIG. 13 is a flowchart illustrating a terminal's operation of receiving scheduling information through a scheduling channel according to another embodiment of the present disclosure.

Referring to FIG. 13, a terminal receives a main scheduling channel from a serving base station in operation 1301. In operation 1301, to receive the main scheduling channel, the terminal uses an optimal reception beam through which a signal of the serving base station is received at the highest strength. The terminal determines whether a not-scheduled indication described with reference to FIG. 12 has been received through the main scheduling channel, in operation 1303. If having received the not-scheduled indication, the terminal terminates a subsequent operation of receiving a scheduling channel. If not having received the not-scheduled indication, that is, if having been scheduled normally, the terminal continues, for example, transmission/reception of main/sub-scheduling channels described in the embodiment of FIG. 9, in operation 1305.

Figure 14:
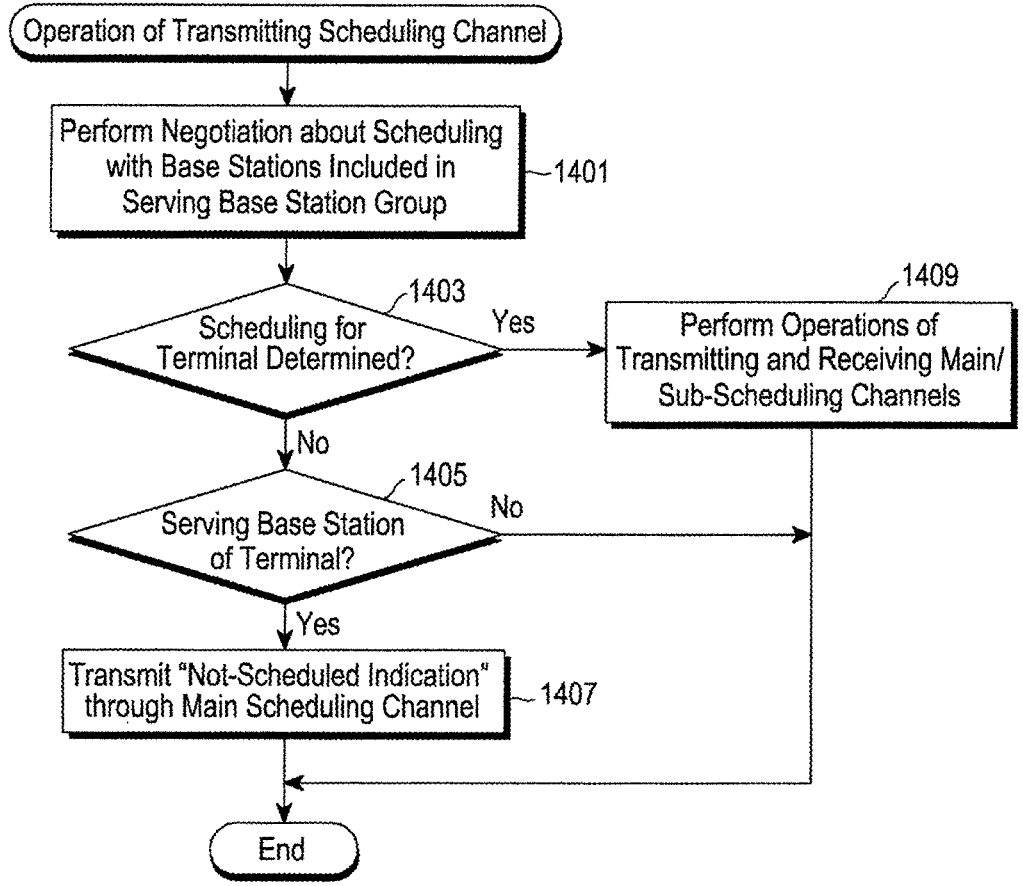
FIG. 14 is a flowchart illustrating a base station's operation of transmitting scheduling information through a scheduling channel according to another embodiment of the present disclosure.

FIG. 14 is a flowchart illustrating a base station's operation of transmitting scheduling information through a scheduling channel according to another embodiment of the present disclosure.

Although an operation performed for one terminal has been illustrated in the embodiment of FIG. 14, the base station repeats the operation illustrated in FIG. 11. for all terminals including the base station as a scheduling candidate in the serving base station group.

Referring to FIG. 14, the base station performs, for the terminal, negotiation about scheduling with base stations included in the serving base station group of the terminal in operation 1401. The negotiation may include, as negotiation subjects, a base station for transmitting and receiving data and scheduling information, data transmission and reception times, resources to be used for data transmission and reception, transmission and reception beams to be used for data transmission and reception, multi-antenna setting information to be used for data transmission and reception, and so forth. If transmission and reception of data and/or a control signal for the terminal are scheduled in operation 1403 as a result of the negotiation in operation 1401, the base station performs transmission of main/sub-scheduling channels and/or transmission and reception of a data channel in operation 1409. If data transmission and reception for the terminal are not scheduled in operation 1403, the base station determines whether the base station is a serving base station of the terminal in operation 1405. If the base station is a serving base station of the terminal, the base station transmits a not-scheduled indication to the terminal through the main scheduling channel in operation 1407.

Another embodiment of the present disclosure proposes a method in which when a sub-scheduling channel is set for each reception beam of a terminal, base stations jointly transmit the same scheduling and/or control signal to the terminal through main/sub-scheduling channels to improve scheduling channel reception performance of the terminal. This embodiment also proposes an operation in which the terminal jointly receives and jointly decodes the scheduling and/or control signal received from the base stations through the main/sub-scheduling channels to improve its scheduling and/or control signal reception performance.

Figure 15:
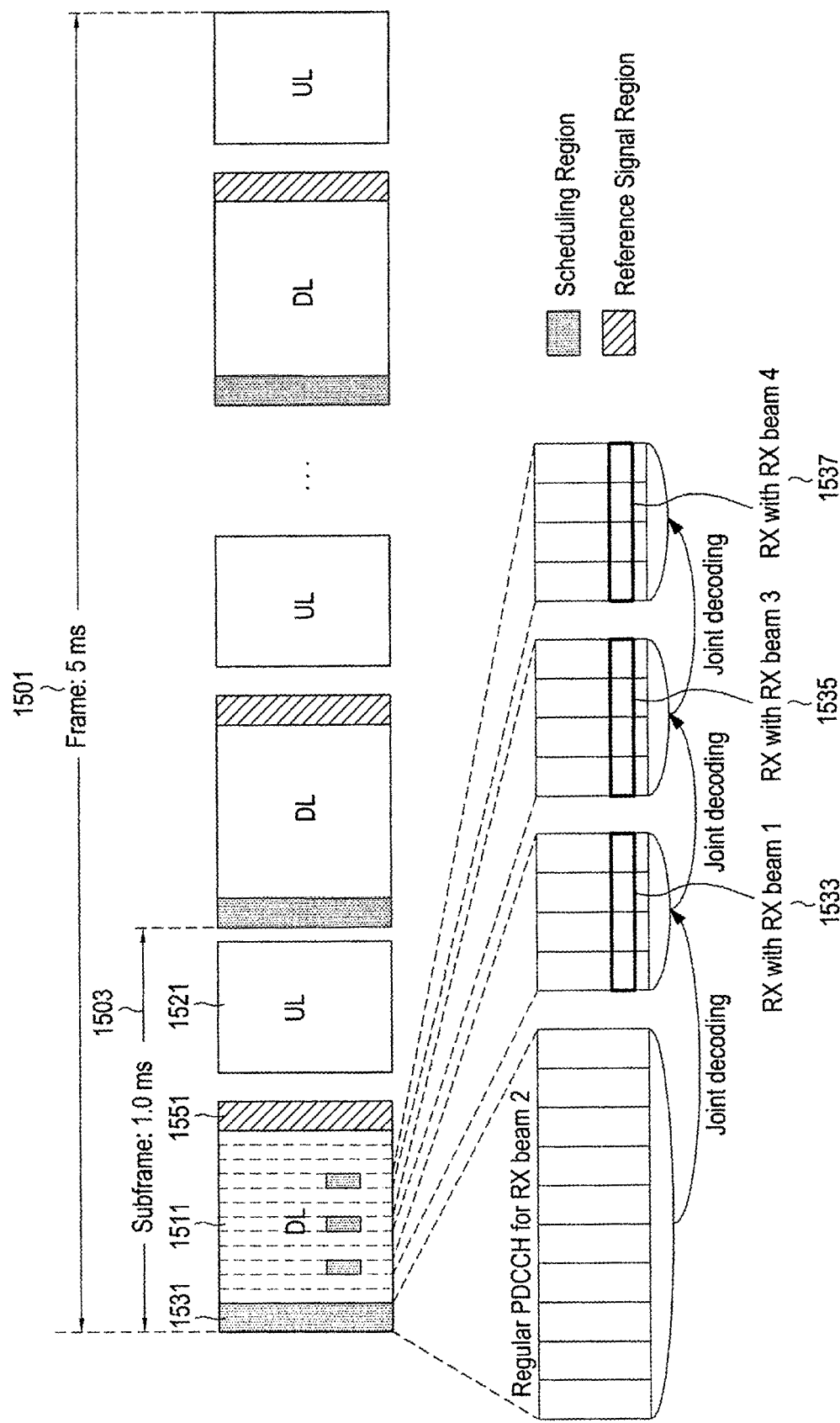
FIG. 15 illustrates an example of a frame structure for jointly transmitting and receiving scheduling information according to another embodiment of the present disclosure.

FIG. 15 illustrates an example of a frame structure for jointly transmitting and receiving scheduling information according to another embodiment of the present disclosure.

A basic structure of a frame 1501 illustrated in FIG. 15 is similar with the structure of the frame 701 described with reference to FIG. 7A. That is, one frame 1501 may, for example, have a length of 5 ms and five sub-frames 1503. Each sub-frame 1503 is divided into a downlink 1511 for transmitting a signal from a base station to a terminal and an uplink 1521 for transmitting a signal from the terminal to the base station. A scheduling region 1531 is a region in the frame structure in which a main scheduling channel used for transmission of scheduling information from the base station to the terminal is transmitted, and a part of the downlink 1521 is used as a reference signal region 1551 for transmitting a downlink reference signal.

In an example of FIG. 15, if base stations determine to perform joint transmission with respect to a scheduling channel of a terminal, a serving base station of the terminal transmits a scheduling and/or control signal of the terminal through a main scheduling channel, and candidate base stations of the serving base station group jointly transmit the same scheduling and/or control signal through a (main or sub-) scheduling channel corresponding to an optimal reception beam between a corresponding base station and the terminal. In the example of FIG. 15, the terminal jointly receives and jointly decodes scheduling and/or control signals received from different base stations through main/sub-scheduling channels 1531, 1533, 1535, and 1537.

Figure 16:
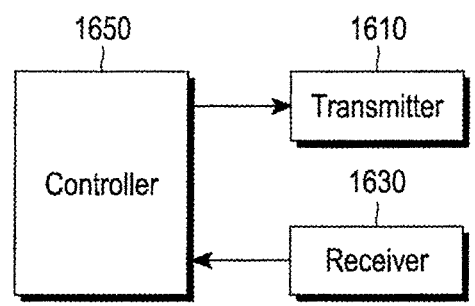
FIG. 16 is a block diagram of a base station according to an embodiment of the present disclosure.

FIG. 16 is a block diagram of a base station according to an embodiment of the present disclosure.

Referring to FIG. 16, the base station may include a transmitter 1610 for transmitting a scheduling and/or control signal and data over a wireless network and a receiver 1630 for receiving data transmitted from the terminal over the wireless network. The base station illustrated in FIG. 16 may also include a controller 1650 for controlling an operation of the transmitter 1610 to transmit a scheduling and/or control signal to a terminal through main/sub-scheduling channels that are set according to the embodiments of the present disclosure described with reference to FIGS. 5 through 15 and to transmit data in a downlink, and for controlling a receiving operation of the receiver 1630. For example, the controller 1650 negotiates scheduling for the terminal with at least one other base stations included in the serving base station group, and if the base station is a serving base station and scheduling for the terminal is determined, the controller 1650 transmits a main scheduling channel; if the base station is included in the serving base station group, but is not a serving base station and scheduling for the terminal is determined, then the controller 1650 controls an operation of transmitting a sub-scheduling channel. A detailed operation of the base station structured as illustrated in FIG. 16 is the same as described with reference to FIGS. 5 through 15, and thus will not be described in detail.

Although not shown, a communication interface for scheduling negotiation with other base stations may also be included in the base station.

Figure 17:
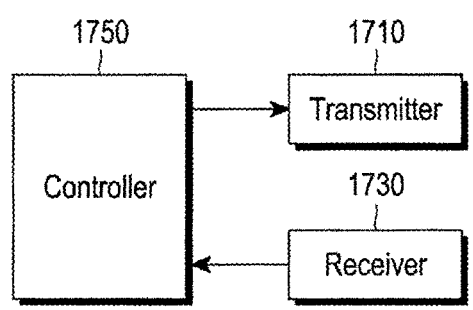
FIG. 17 is a block diagram of a terminal according to an embodiment of the present disclosure.

FIG. 17 is a block diagram of a terminal according to an embodiment of the present disclosure.

Referring to FIG. 17, the terminal may include a transmitter 1710 for transmitting data to a base station over a wireless network and a receiver 1730 for receiving a scheduling and/or control signal and data transmitted from the base station over a wireless network. The terminal may also include a controller 1750 for controlling an operation of the receiver 1730 to receive a scheduling and/or control signal from the base station through main/sub-scheduling channels that are set to correspond to each reception beam direction according to the embodiments described with reference to FIGS. 5 through 15 and to receive data in a downlink, and for controlling an operation of the transmitter 1710 to transmit data in an uplink. For example, the controller 1750 receives a main scheduling channel transmitted from the serving base station by controlling beamforming of each reception beam, determines a resource of a sub-scheduling channel for each reception beam, and controls an operation of receiving, from at least one other base stations included in the serving base station group, a sub-scheduling channel determined not to have a collision with a data transmission/reception resource for each reception beam. To this end, the controller 1750 determines a reception beam in a direction corresponding to the main scheduling channel and the sub-scheduling channel based on reception performance of each reception beam.

A detailed operation of the terminal structured as illustrated in FIG. 15 is the same as described with reference to FIGS. 5 through 15, and thus will not be described in detail.

While the present disclosure has been particularly shown and described with reference to exemplary embodiments thereof, various changes in form and detail may be made therein without departing from the spirit and scope of the present disclosure as defined by the following claims. Accordingly, the scope of the present disclosure will be defined by the appended claims and equivalents thereto.

What is claimed is:

1. A method for receiving scheduling information by a terminal in a wireless communication system, the method comprising:

receiving first scheduling information from a first base station using a first scheduling resource; and receiving second scheduling information from each of two or more second base stations cooperating with the first base station using two or more second scheduling resources allocated to two or more reception beams of the terminal, respectively, wherein each of the two or more second scheduling resources is determined from resources on a data region of a downlink (DL) subframe based on reception performance for each of the two or more reception beams, and wherein locations of the two or more second scheduling resources are different in at least one of a time domain and a frequency domain of the data region.

2. The method of claim 1, wherein the first scheduling resource is determined from resources on a control region of the DL subframe.

3. The method of claim 1, further comprising measuring, by the terminal, a signal strength of each of the two or more second base stations, and transmitting, to each of the two or more second base stations, a result of the measurement of the signal strength of each of the two or more second base stations.

4. The method of claim 1, further comprising skipping reception of scheduling information from one of the two or more second base stations in which collision occurs, if a resource for data transmission and reception of the terminal collides with the one of the two or more second scheduling resources.

5. The method of claim 1, further comprising jointly decoding the first scheduling information and the second scheduling information, and wherein the first base station and the two or more second base stations are included in a base station group for serving the terminal.

6. The method of claim 1, wherein each of the two or more reception beams is used to perform communication with each of the two or more second base stations, and wherein a location of each of the two or more second base stations corresponds to a direction of one among the two or more reception beams.

7. The method of claim 1, further comprising:

receiving a not-scheduled indication indicating that the terminal is not scheduled using the first scheduling resource; and stopping reception of the first scheduling information and the second scheduling information based on the not-scheduled indication.

8. A terminal in a wireless communication system, the terminal comprising:

a transceiver; and at least one processor configured to control the transceiver to:

receive first scheduling information from a first base station using a first scheduling resource, and receive second scheduling information from two or more second base stations cooperating with the first base station using two or more second scheduling resources allocated to two or more reception beams of the terminal, respectively, wherein each of the two or more second scheduling resources is determined from resources on a data region of a downlink (DL) subframe based on reception performance for each of the two or more reception beams, and wherein locations of the two or more second scheduling resources are different in at least one of a time domain and a frequency domain of the data region.

9. The terminal of claim 8, wherein the first scheduling resource is determined from resources on a control region of the DL subframe.

10. The terminal of claim 8, wherein the at least one processor is further configured to:

measure a signal strength of each of the two or more second base stations and control the transceiver to transmit, to each of the two or more second base stations, a result of the measurement of the signal strength of each of the two or more second base stations.

11. The terminal of claim 8, wherein the at least one processor is further configured to control the transceiver to:
skip reception of scheduling information from one of the two or more second base stations in which collision occurs, if a resource for data transmission and reception of the terminal collides with the one of the two or more second scheduling resources.

12. The terminal of claim 8, wherein the at least one processor is further configured to jointly decode the first scheduling information and the second scheduling information, and
wherein the first base station and the two or more second base stations are included in a base station group for serving the terminal.

13. The terminal of claim 8, wherein each of the two or more reception beams is used to perform communication with each of the two or more second base stations, from among a plurality of reception beams of the terminal, and
wherein a location of each of the two or more second base stations corresponds to a direction of one among the two or more reception beams.

14. The terminal of claim 8, wherein the at least one processor is further configured to control the transceiver to:
receive a not-scheduled indication indicating that the terminal is not scheduled using the first scheduling resource, and stop reception of the first scheduling information and the second scheduling information based on the not-scheduled indication.

15. A method for transmitting scheduling information by a first base station in a wireless communication system, the method comprising:
determining first scheduling information for a terminal by performing communication with two or more second base stations cooperating with the first base station, second scheduling information for the terminal being determined in each of the two or more second base stations based on the communication and being transmitted through two or more second scheduling resources; and
transmitting, to the terminal, the first scheduling information through a first scheduling resource,
wherein each of the two or more second scheduling resources is determined from resources on a data region of a downlink (DL) subframe based on reception performance for each of two or more reception beams, and
wherein locations of the two or more second scheduling resources are different in at least one of a time domain and a frequency domain of the data region.

16. The method of claim 15, wherein the first scheduling resource is determined from resources on a control region of the DL subframe.

17. The method of claim 15, wherein a location of each of two or more second base stations corresponds to a direction of one among the two or more reception beams, and the first base station and the two or more second base stations are included in a base station group for serving the terminal.

18. A first base station in a wireless communication system, the first base station comprising:
a transceiver;
a communication interface configured to communicate with two or more second base stations cooperating with the first base station; and
at least one processor configured to:
control the communication interface to determine first scheduling information for a terminal by performing communication with the two or more second base stations, second scheduling information for the terminal being determined in each of the two or more second base stations based on the communication and being transmitted through two or more second scheduling resources, and
control the transceiver to transmit, to the terminal, the first scheduling information through a first scheduling resource,
wherein each of the two or more second scheduling resources is determined from resources on a data region of a downlink (DL) subframe based on reception performance for each of two or more reception beams, and
wherein locations of the two or more second scheduling resources are different in at least one of a time domain and a frequency domain of the data region.

19. The first base station of claim 18, wherein the first scheduling resource is determined from resources on a control region of the DL subframe.

20. The first base station of claim 18, wherein a location of each of the two or more second base stations corresponds to a direction of one among the two or more reception beams, and the first base station and the two or more second base stations are included in a base station group for serving the terminal.

* * * * *